United States Patent
Skov et al.

(10) Patent No.: US 9,031,556 B2
(45) Date of Patent: May 12, 2015

(54) HANDLING SYNCHRONIZATION IN AN UNCOORDINATED DEPLOYMENT

(75) Inventors: Peter Skov, Beijing (CN); Jie Zhen Lin, Beijing (CN); Chun Hai Yao, Beijing (CN)

(73) Assignee: Nokia Solutions & Networks Oy, Espoo (FI)

( * ) Notice: Subject to any disclaimer, the term of this patent is extended or adjusted under 35 U.S.C. 154(b) by 164 days.

(21) Appl. No.: 13/145,405

(22) PCT Filed: Jan. 28, 2009

(86) PCT No.: PCT/EP2009/000549
§ 371 (c)(1),
(2), (4) Date: Jul. 20, 2011

(87) PCT Pub. No.: WO2010/085973
PCT Pub. Date: Aug. 5, 2010

(65) Prior Publication Data
US 2011/0275370 A1    Nov. 10, 2011

(51) Int. Cl.
*H04W 4/00* (2009.01)
*H04W 24/02* (2009.01)
*H04W 48/16* (2009.01)

(52) U.S. Cl.
CPC ............ *H04W 24/02* (2013.01); *H04W 48/16* (2013.01)

(58) Field of Classification Search
CPC ...... H04W 48/16; H04W 36/30; H04W 60/00
USPC ............... 455/434, 436, 435.1; 370/235, 254
See application file for complete search history.

(56) References Cited

U.S. PATENT DOCUMENTS

| | | | |
|---|---|---|---|
| 7,916,666 B2* | 3/2011 | Yoon et al. | 370/255 |
| 2008/0167003 A1* | 7/2008 | Wang et al. | 455/411 |
| 2008/0311914 A1* | 12/2008 | Tinnakornsrisuphap et al. | 455/436 |
| 2009/0215482 A1* | 8/2009 | Blange et al. | 455/509 |
| 2009/0309749 A1* | 12/2009 | Gilbert et al. | 340/815.45 |
| 2010/0035642 A1* | 2/2010 | Iwamura et al. | 455/507 |

OTHER PUBLICATIONS

3GPP TS 36.902 V1.0.1 (Sep. 2008), "3rd Generation Partnership Project; Technical specification Group Radio Access Network; Evolved Universal Terrestrial Radio Access Network (E-UTRAN); Self-configuring and self-optimizing network use cases and solutions (Release 8)", 15 pgs.
3GPP TS 36.401 V8.4.0 (Dec. 2008), "3rd Generation Partnership Project; Technical Specification Group Radio Access Network; Evolved Universal terrestrial Radio Access Network (E-UTRAN); Architecture description (Release 8)", 19 pgs.
R1-090236, 3GPP TSG RAN WG1 #55-bis Meeting, Ljubljana,Slovenia, Jan. 12-16, 2009, Nokia Siemens Networks, Nokia, "Inter ENB over-the-air communication (OTAC) for LTE-Advanced", 4 pgs.

* cited by examiner

*Primary Examiner* — Chuck Huynh
(74) *Attorney, Agent, or Firm* — Harrington & Smith

(57) ABSTRACT

The present invention relates to methods, apparatuses, a system, and a computer program product for synchronizing to an uncoordinated access network. A new access device added to the access network is temporarily set into an over-the-air discover state and identification signals are broadcast from the new access device. Operating access devices are set into an discovery state in response to a detection of the identification signal, wherein their inter access device over-the-air transmission is stopped during the discovery state and an identity of the new access device is searched.

21 Claims, 6 Drawing Sheets

HANDLING SYNCHRONIZATION IN AN UNCOORDINATED DEPLOYMENT

FIELD OF THE INVENTION

The present invention relates to methods, apparatuses, computer program products, and a system for handling synchronization of existing access devices to a new access device in an uncoordinated deployment of access devices of a wireless network environment.

BACKGROUND OF THE INVENTION

The long term evolution (LTE) program of the $3^{rd}$ Generation Partnership Project (3GPP) has been developed to provide improved spectral efficiency, reduced latency, and better utilization of radio resources for faster user experiences and enhanced applications and lower cost services. As part of these efforts, the 3GPP has introduced a concept of an in-home evolved Node-B (HeNB) for LTE networks, which can be regarded as a kind of local area evolved Node-B (eNB). Such local area eNBs correspond to physical access devices or base station devices, which may be similar to a wireless local area network (WLAN) access point (AP). The local area eNB provides users with access to LTE services over extremely small service areas, such as homes or small offices. The local area eNB is intended to connect to the operator's core network by using, for example, public Internet connections, for example, digital subscriber line (DSL). This can be useful in areas where LTE has not been deployed, and/or in areas where conventional or legacy 3GPP radio access technology coverage already exists. Furthermore, the above concept may also be useful in areas where LTE coverage may be faint or non-existent due to, for example, the occurrence of radio transmission problems, in an underground metro or shopping mall, for example.

A local area eNB may be used to deploy one or more closed subscriber group (CSG) cells which are a defined area over which radio coverage provided by the local area eNB may only be accessed by a group of subscribers authorized to use the services of the cell. The subscriber, whether an individual or an organization, may deploy a CSG cell using a local area eNB over an area where such a service is desired.

Cheap deployment of local area eNBs could be achieved, if global synchronization (achieved for example by a common clock based on the Global Positioning System (GPS)) was dispensed with and synchronization between eNBs was handled via the air interface between the eNBs. This however might lead to a problem in case one eNB is transmitting to terminal devices (for example user equipments (UEs)) while other eNBs are transmitting a synchronization signal.

When an eNB is booting in the vicinity of other eNBs in an uncoordinated deployment without global synchronization, it could start by a cell search procedure by which surrounding cells can be detected. Then, the corresponding system information could be decoded. This system information could also contain over-the-air communication (OTAC) configuration parameters, so that the eNB is enabled to start operating and also receive OTAC messages from other base stations or access devices via an air interface after synchronization is obtained.

However, eNBs which are already in operation may not yet have synchronized/detected the new eNB and could thus not be able to receive OTAC messages from the new eNB if reception of OTAC messages requires such synchronization/detection.

SUMMARY OF THE INVENTION

In some embodiments relating to one transmission end, a method comprises:
   adding a new access device to an uncoordinated access network;
   initiating an over-the-air discover procedure by temporarily setting said new access device into a discovery state and broadcasting from said new access device identification signals;
   transferring to a communication state in response to an acknowledgement from surrounding access devices received or an expiry of a timer; and
   restarting said over-the-air discover procedure if no acknowledgement has been received from any of the surrounding access devices.

Furthermore, in some embodiments relating to the other transmission end, a method comprises:
   entering into a discovery state in response to a detection of an identification signal from a new access device added to an uncoordinated access network; and
   stopping over-the-air transmission during said discovery state and determining an identity of said new access device.

Additionally, in some embodiments on the one transmission end, an apparatus comprises:
   state control means for temporarily switching to a discovery state when the apparatus is added to an access network; and
   transmission control means for broadcasting an identification signal in response to said switching to said discovery state, and waiting for a response from said surrounding access devices.

Moreover, in some embodiments relating to the other transmission side, an apparatus comprises:
   state control means for entering into a discovery state in response to a detection of an identification signal from a new access device; and
   transmission control means for stopping over-the-air transmission during said discovery state and for initiating a determination operation for an identity of said new access device.

The above methods may be implemented as a computer program product comprising code means for producing the respective above steps when run on a computer device.

The above apparatuses may be implemented as network elements or nodes, fixed or mobile terminal devices, which act as access devices, or may be implemented as modules, chips or chip sets provided in these nodes, elements or devices.

Accordingly, a specific signaling is provided by the new access device and transmitted in a period during which other access devices are controlled to listen. Thereby, the synchronization or over-the-air discover procedure can be activated on a need basis. If no access device requires synchronization, no resources need to be dedicated. In view of the fact that booting of new access devices in the uncoordinated network is not expected to happen very often, network resources can be saved. Additionally, new access devices can be detected quickly by other access devices. A state machine can be introduced for communication channel(s) between access devices to indicate whether a new access device is entering the system or not. The state machine could be designed with two states, for example, which could be named "discover" and "communicate", and state transitions can be based on whether a newly booted access device is transmitting a physical synchronization signal and whether other access devices have detected this.

The identification signal may be broadcast via a wireless interface. Similarly, transmission of the message and reception of the response may as well be achieved via the wireless interface. Moreover, an acknowledging signaling to the new access device may be performed via the wireless interface.

Furthermore, the temporary setting into the discovery state may be performed after a cell search procedure of the new access device has been finished and an over-the-air communication configuration is known to the new access device.

Switching back from the discovery state to a communication state of the new access device may be performed in response to a timer operation or acknowledging signaling from surrounding access devices.

Additionally, the identification signal may be coded with the identity.

At least one of broadcasting the identification signal via the wireless interface, transmitting the message via the wireless interface, and receiving the response via the wireless interface may be controlled by the transmission control means.

At least one of initiating the temporary setting into the discovery state and switching back from the discovery state to the communication state may be controlled by the state control means.

Further advantageous developments or modifications are defined in the dependent claims.

BRIEF DESCRIPTION OF THE DRAWINGS

Some embodiments will no be described with reference to the accompanying drawings in which.

DESCRIPTION OF EMBODIMENTS

In the following, some embodiments will be described in greater detail based on an LTE network architecture for a Universal Mobile Telecommunications System (UMTS) which includes a radio access network (RAN). In UMTS, the RAN is called UTRAN (UMTS Terrestrial RAN). An aspect of the LTE system is referred to as "evolved UMTS Terrestrial RAN" (E-UTRAN).

Figure 1:
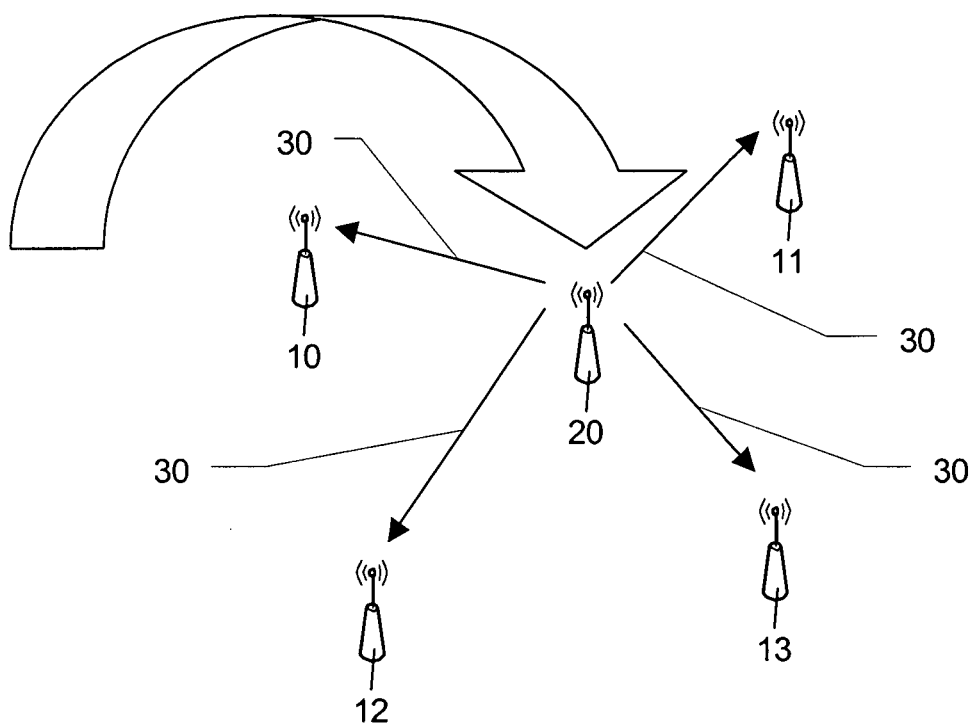
FIG. 1 shows a schematic diagram indicating a network architecture in which embodiments can be implemented.

FIG. 1 shows an example of an E-UTRAN architecture. The exemplary architecture consists of a plurality of local area access devices, for example eNBs 10 to 13, which provide user plane and control plane protocol termination towards terminal devices (for example UEs, not shown). The eNBs 10 to 13 are interconnected with each others by means of X2 interfaces. Additionally, the eNBs 10 to 13 are also connected via S1 interfaces to an evolved packet core (not shown), more specifically a mobility management entity (MME, not shown) and a user plane entity (UPE, not shown). The S1 interfaces support many-to-many relation between MMEs/UPEs and the eNBs 10 to 13. Furthermore, the S1 interface supports a functional split between the MME and the UPE.

The X2 interface between the eNBs 10 to 13 can be used for communicating with each other. In various embodiments, this communication may include over-the-air (OTA) transmission between eNBs and/or other types of access devices (such as base stations). Each of the eNBs 10 to 13 may host functions such as radio resource management (radio bearer control, radio admission control, connection mobility control, dynamic allocation of resources to UEs in both uplink and downlink), selection of a MME at UE attachment, routing of user plane data towards the UPE, scheduling and transmission of paging messages (originated from the MME), scheduling and transmission of broadcast information (originated from the MME or operation and maintenance (O&M) devices), and measurement or measurement reporting configuration for mobility and scheduling.

According to FIG. 1, a new eNB 20 is added to the E-UTRAN and after cell search, it initiates a synchronization process with the surrounding eNBs 10 to 13. To achieve this, an identification signal 30 is broadcast from the new eNB 20, for example within a predetermined OTAC region which can be a specific set of resources in time, frequency or code domain and which can be used by the operating eNBs 10 to 13 to detect the new eNB 20.

Based on the transmission or reception, respectively, of the identification signal 30 the operating eNBs 10 to 13 and the new eNB 20 are set into an OTAC Discover state. This OTAC Discover state can be used for OTAC signaling in order to achieve proper synchronization. During this OTAC Discover state, the newly booted eNB 20 can transmit the physical identification signal 30 for a predetermined period (for example in several OTAC regions), while the surrounding eNBs can detect the identification signal and know the booted new eNB20.

Figure 2:
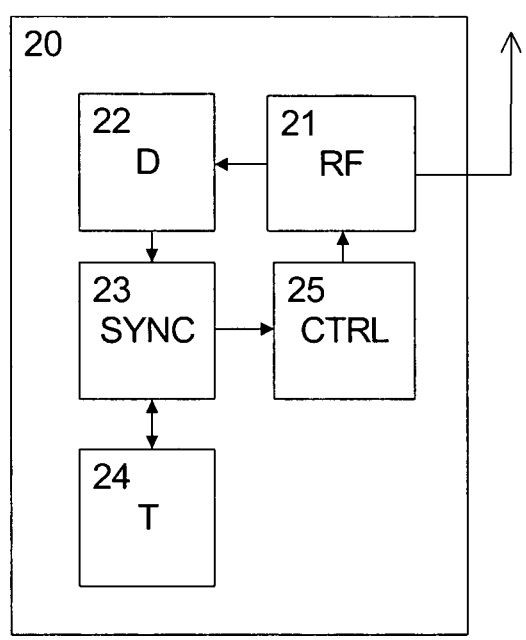
FIG. 2 shows a schematic block diagram of an access device according to an embodiment.

FIG. 2 shows a schematic block diagram of an access device, such as the new eNB 20 or the operating eNBs 10 to 13. The block diagram of FIG. 2 shows components which can be used by both transmission ends, new eNB 20 and operating eNBs 10 to 13. A radio frequency (RF) front end 21 is provided to enable transmission and reception of RF signals between the eNBs via an air interface. A reception output of the RF front end 21 is supplied to a detector function or unit (D) 22 which is configured to detect identification signals of new eNBs. When an identification signal has been detected by the detection unit 22 a synchronization control function or unit (SYNC) 23 is controlled to set the eNB 20 into the OTAC Discover state for a predetermined time period. This predetermined time period may be set by a timing functionality or timer (T) 24. During the synchronization period, the synchronization control unit 23 triggers a state control function or unit (CTRL) 25 so that any transmission is stopped or suppressed and reception is enabled.

If the eNB 20 is added as a new access device in an access network or booted in an access network, the synchronization control unit 23 controls the transmission control unit 25 to broadcast the identification signal with a coded identity via the RF front end 21 within at least one OTAC region. The identity may be coded in the identification signal by using any kind of coding or modulation scheme. The identification signal may be detectable based on a timing, frequency, coding, preamble or any other suitable transmission parameter. Similarly, the coding may be achieved by any kind of modulation of the identification signal or any kind of addition of the identity information.

It is noted that FIG. 2 shows the functionalities for both transmission ends. In specific embodiments, only the transmission side functionality or the reception side functionality with regard to the identification signal may be required. In such cases, some of the functionalities described in connection with FIG. 2 could be dispensed with.

Figure 3:
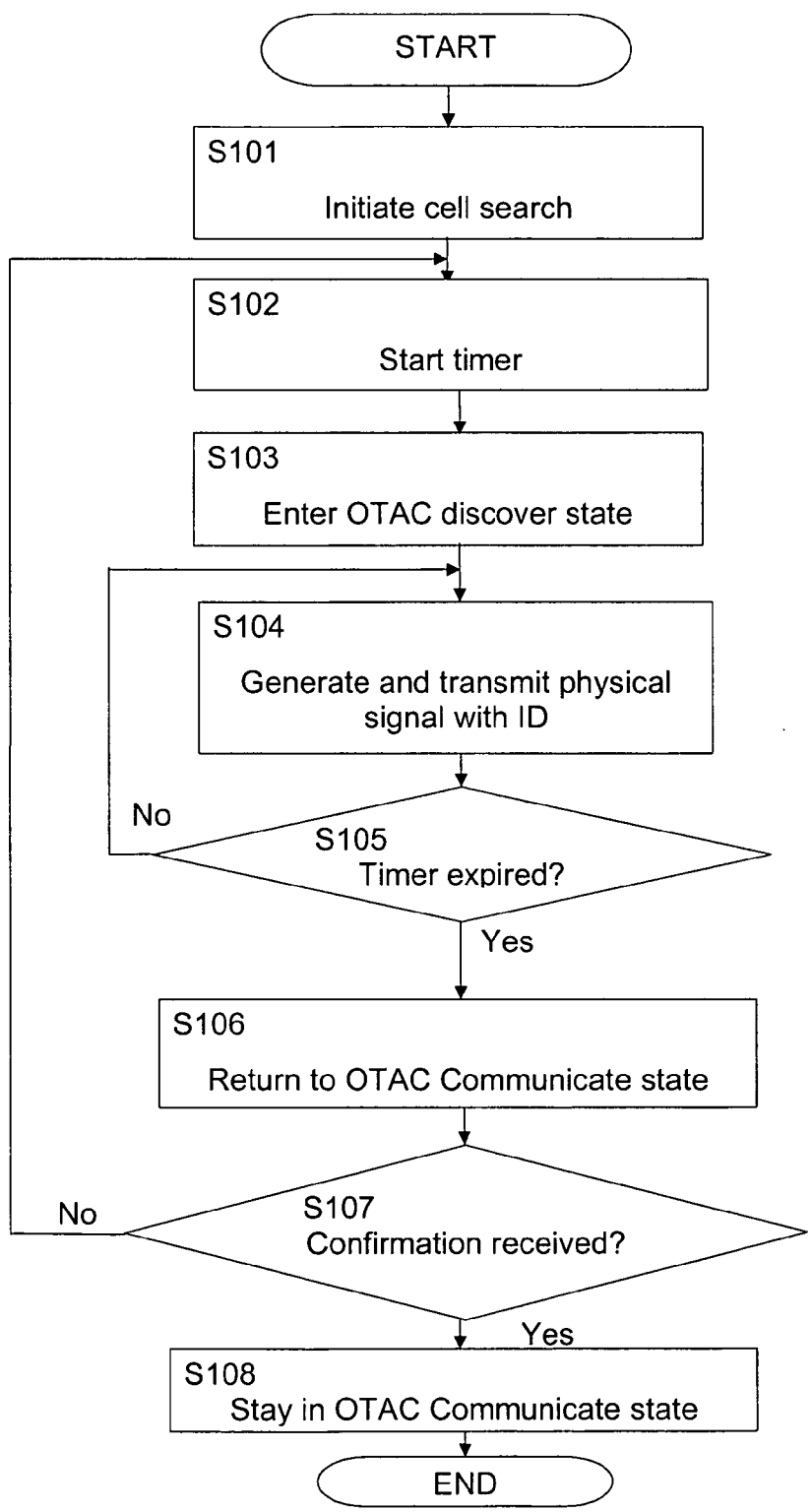
FIG. 3 shows a schematic flow diagram of a detection processing according to an embodiment at one transmission end.

FIG. 3 shows a schematic flow diagram of a synchronization procedure performed when a new eNB is added to an access network. When the new eNB is added to the network or is booted in the network, a cell search procedure is initiated in step S101 to gain information on surrounding eNBs or other access devices. Then, in step S102 a timer (for example timer 24 in FIG. 2) is started and the new eNB is set into an OTAC Discover state (step S103), for example by the synchronization control unit 23 of FIG. 2. Then, a physical identification signal with an identity of the new eNB is generated in step S104, for example by the transmission control unit 25 of FIG. 2. This identification signal is transmitted as a broadcast signal within at least one OATC region. In step S105, it is checked whether the timer has expired. If not, the procedure jumps back to step S104 and continues transmitting the identification signal. If it is determined in step S105 that the timer has expired, the new eNB is returned or reset to an OTAC Communicate state (step S106), for example by the synchronization control unit 23 of FIG. 2 in response to the output of the timer 24 in FIG. 2. Then, in step S107, it is checked whether a confirmation has been received. If it is determined in step S107 that a response has been received, synchronization has been achieved and the new eNB stays in the OTAC Communicate state (S108) and the procedure ends. If not, the procedure jumps back to step S102 and the timer is started again to repeat the synchronization procedure.

Thus, transition from the OTAC Discover state to the OTAC Communicate state of a new eNB can be done based on the timer, and in OTAC Discover state, a new eNB may transmit the physical identification signal continuously in one or several OTAC regions subject to the timer. Once in normal state (e.g. OTAC Communicate state) the booted eNB can receive ordinary OTAC messages from other eNBs and these messages include information about whether surrounding eNBs or other types of access devices (e.g. base stations) did detect the newly booted eNB. If not, the procedure can start again.

Figure 4:
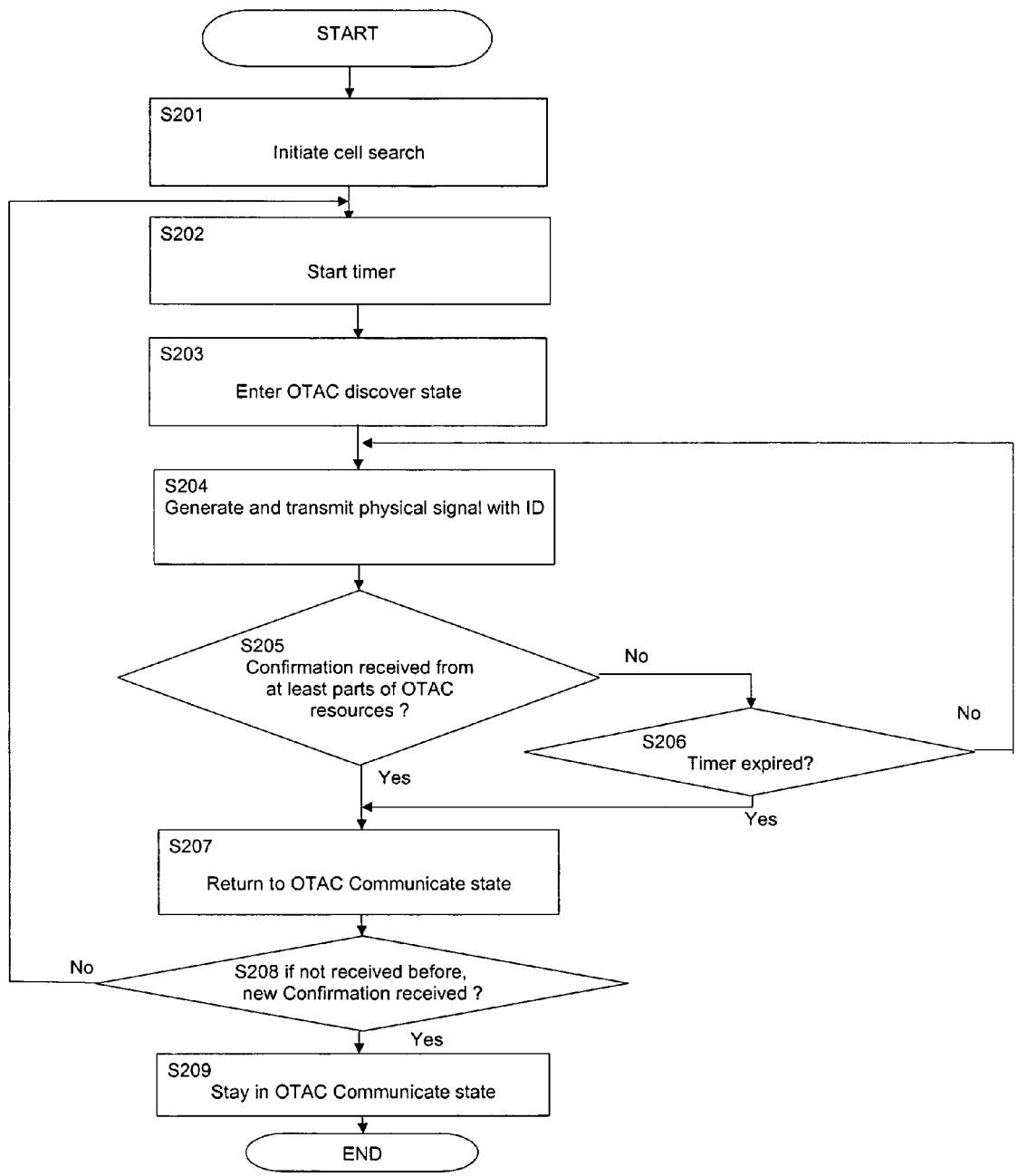
FIG. 4 shows a schematic flow diagram of a detection processing according to an alternative embodiment at the one transmission end.

FIG. 4 shows a schematic flow diagram of an alternative synchronization procedure performed when a new eNB is added to an access network. Here, parts of OTAC resources are reserved in the OTAC Discover state for adjacent eNBs to acknowledge the discovery. When the new eNB is added to the network or is booted in the network, a cell search procedure is initiated in step S201 to gain information on surrounding eNBs or other access devices. Then, in step S202 a timer (for example timer 24 in FIG. 2) is started and the new eNB is set into an OTAC Discover state (step S203), for example by the synchronization control unit 23 of FIG. 2. Then, a physical identification signal with an identity of the new eNB is generated in step S204, for example by the transmission control unit 25 of FIG. 2. This identification signal is transmitted as a broadcast signal within at least one OATC region. In step S205, it is checked whether a confirmation is received from parts of OTAC resources reserved for adjacent eNBs' acknowledgement. If so, the new eNB is returned to the OTAC Communicate state (step S207). Otherwise, if no confirmation has been received from the reserved OTAC resources, it is checked in step S206 whether the timer has expired. If not, the procedure jumps back to step S204 and continues transmitting the identification signal.

If it is determined in step S206 that the timer has expired, the procedure continues with step S207 and the new eNB is returned or reset to the OTAC Communicate state, for example by the synchronization control unit 23 of FIG. 2 in response to the output of the timer 24 in FIG. 2. Then, in step S208, it is checked whether a new confirmation has been received. If it is determined in step S208 that a response has been received, synchronization has been achieved and the new eNB stays in the OTAC Communicate state (step S209) and the procedure ends. If not, the procedure jumps back to step S202 and the timer is started again to repeat the synchronization procedure.

The acknowledgement could be implemented by a simple physical signal which does not need to indicate which eNB has acknowledged. Receiving this signal or confirmation indicates to the newly booted eNB that at least one other eNB has detected the activation. Even if no other node sends an acknowledgment or confirmation, the transmission of the identification signal is stopped after expiry of the timer and a state transition can be triggered. As in the procedure of FIG. 3, newly booted eNB can decide in the OTAC Communicate state whether to restart the procedure e.g. based on a predetermined scheme such as an information from OTAC messages.

Figure 5:
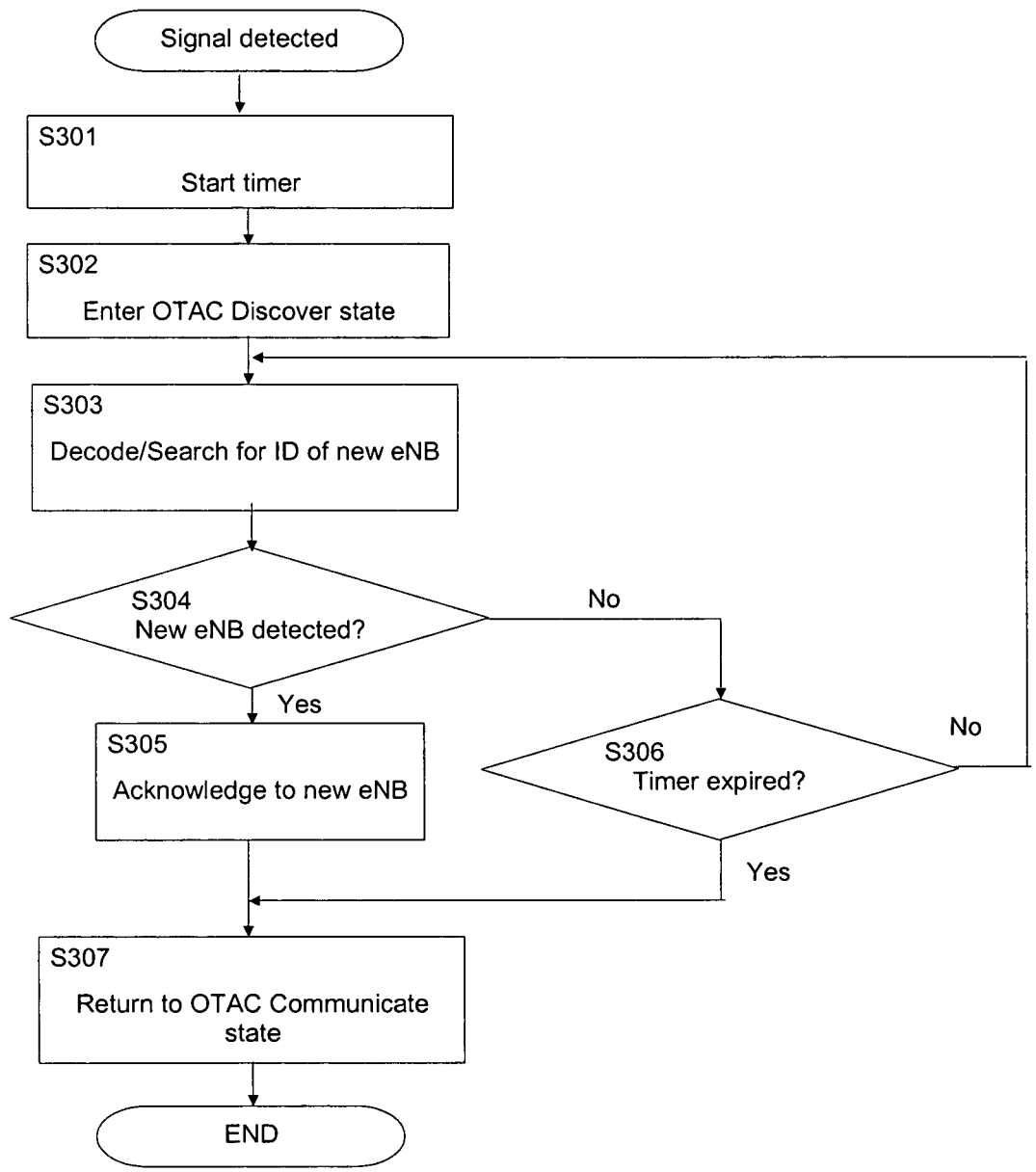
FIG. 5 shows a schematic flow diagram of a detection processing according to an embodiment at the other transmission end.

FIG. 5 shows a schematic flow diagram of a synchronization processing at an operating eNB of an access network. The procedure is initiated when an identification signal from a new eNB has been detected. In a first step S301 a timer (for example the timer 24 in FIG. 2) is started. In response thereto, the eNB is set into a OTAC Discover state in step S302, for example by the synchronization control unit 23 of FIG. 2. Then, in step S303, a search for or decoding or determination of an identity (ID) of the new eNB is initiated, for example by the detector unit 22 in FIG. 2 or a separate search unit. Thereafter, it is checked in step S304 whether the new eNB was detected with ID retrieved. If detected, the procedure continues with step S305 and an acknowledgement is sent to the new eNB. Then, in step S307, the operating eNB is returned to the OTAC Communicate state. Otherwise, if a new eNB is not detected in step S304, the procedure continues with step S306 and checks whether the timer has expired. If not, the procedure jumps back to step S303 and continues the search procedure. If it is determined in step S306 that the timer has expired, a return to the OTAC Communicate state is initiated in step S307, for example by the synchronization control unit 23 of FIG. 2. Then, the eNB continues operating in its OTAC Communicate state and the procedure ends.

Thus, when a booting eNB has finished its cell search procedure and knows surrounding eNBs and the OTAC configuration, then the booted eNB's OATC operation state enters into the OTAC Discover state and starts to transmit the identification signal in at least one OTAC region. The booting eNB transmits for a certain period defined by the timer. This period may be several half frames or radio frames which may contain several OTAC regions. Surrounding eNBs which detect the identification signal are also subjected to the state change into the OTAC Discover state for a predetermined time period which may be pre-defined by a timer. They are controlled to be kept in a receiving state during the OTAC Discover state without any transmission of OTAC messages until they are acknowledged with the newly booted eNB.

The identity with which the identification signal is coded can be used to decode OTAC messages received from the newly booted eNB. The operating eNBs may readily detect a state change when the new eNB sends the physical identification signal. However, the state change into the OTAC Discover state of the operating eNBs may as well be achieved in response to the detection of the new identity itself. The mere detection of the presence of the identification signal provides the advantage that operating eNBs only need to check whether a physical signal is present among ordinary OTAC messages, but not what it contains. Once the identification signal is detected, operating eNBs will enter into the OTAC Discover state and start searching for the identity of the newly booted eNB. Once the newly booted eNB has returned to the OTAC Communicate state, it knows based on response messages whether surrounding eNBs have detected it.

The synchronization procedure can thus be activated if needed, so that resources are only dedicated if a synchronization procedure is required.

Figure 6:
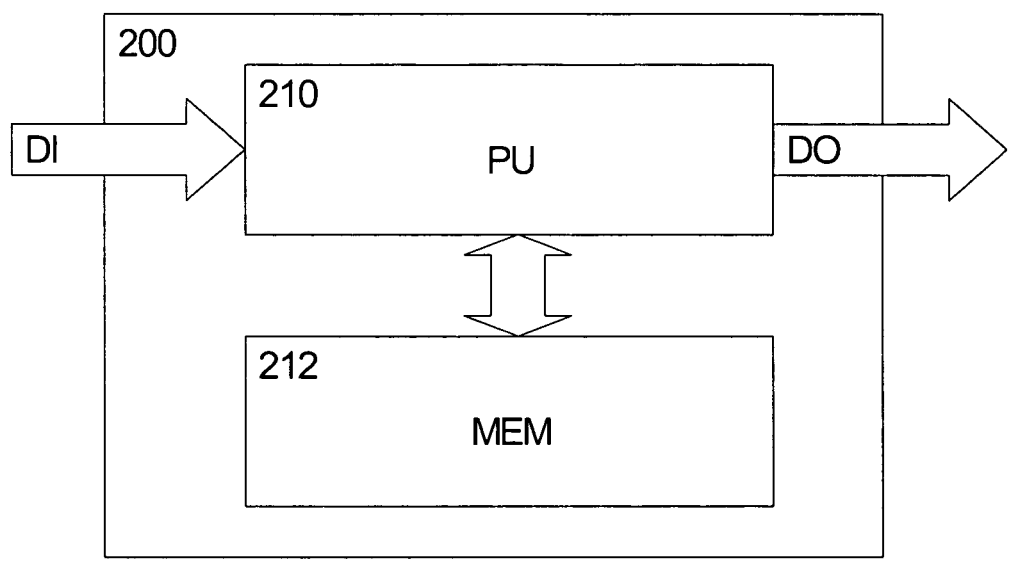
FIG. 6 shows a schematic block diagram of a software-based implementation according to an embodiment.

FIG. 6 shows a schematic block diagram of an alternative software-based implementation of the above embodiments. The required functionalities can be implemented in a processing unit (PU) 210, which may be any processor or computer device with a control unit which performs control based on software routines of a control program stored in a memory (MEM) 212. The control program may also be stored separately on a computer-readable medium. Program code instructions are fetched from the memory 212 and are loaded to the control unit of the processing unit 210 in order to perform the processing steps of the above functionalities of blocks 22 to 25 of FIG. 2 or the steps of FIGS. 3 to 5, which may be implemented as the above mentioned software routines. The processing steps may be performed on the basis of input data DI and may generate output data DO. At a newly booted eNB the input data DI may correspond to a control input which indicates addition to the access network or initiation of a booting operation. The output data DO may correspond to the identification signal with the identity to be broadcast within the access network. At an operating eNB, the input data may correspond to a detected identification signal and the output data DO may correspond to an OATC message with the retrieved identity for responding to the newly added eNB.

Consequently, the above embodiments may implemented as a computer program product comprising code means for generating each individual processing step when run on a computer device or data processor of a respective access device or base station, for example, the new eNB 20 or the operating eNBs 10 to 13 in FIG. 1.

In summary, methods, apparatuses, a system, and a computer program product for synchronizing to an uncoordinated access network have been described. A new access device added to the access network is temporarily set into a discovery state and an identification signal is broadcast from the new access device (20). Operating access devices are set into an discovery state in response to a detection of the identification signal, wherein their inter access device over-the-air transmission is stopped during the discovery state and an identity of the new access device is searched.

It is apparent that the invention can easily be extended to any access network with any kind of access devices which need to be synchronized and to which a new access device can be added. Specifically, the invention is not intended to be restricted to LTE or UMTS architectures with Node-B devices. Any kind of identification signal and identity can be used during the discovery state. Moreover, the two states could be named differently as long as they have the functionality described in connection with the above embodiments.

The invention claimed is:

1. A method comprising:
    adding a new access device to an uncoordinated access network;
    initiating an over-the-air discover procedure by temporarily setting said new access device into a discovery state and broadcasting from said new access device physical identification signals in at least a portion of resources used by surrounding access devices for over-the-air (OTA) communication;
    transferring to a communication state in response to an acknowledgement of the detection of the physical identification signals received from the surrounding access devices or an expiry of a timer, wherein the acknowledgement is a physical signal carried in the at least a portion of the OTA resources and does not indicate specific ones of the surrounding access devices; and
    restarting the over-the-air discover procedure when no acknowledgement has been received from any of said surrounding access devices.

2. A method according to claim 1, further comprising broadcasting said physical identification signal via a wireless interface.

3. A method according to claim 1, further comprising transmitting a message and receiving said response via a wireless interface.

4. A method according to claim 1, further comprising performing said temporary setting into said discovery state after a cell search procedure of said new access device has been finished and an over-the-air communication configuration is known to said new access device.

5. A method according to claim 1, further comprising switching back from said discovery state to a communication state of said new access device in response to a timer operation.

6. A compute program product comprising a non-transitory computer-readable medium bearing computer program code embodied therein for use with a computer, the computer program code, when executed by the computer, causing the computer to perform the method of claim 1.

7. A method comprising:
    in a communication device operating in a communication state for over-the-air (OTA) communication in an uncoordinated access network,
    entering from the communication state into a discovery state in response to a detection of a physical identification signal in at least a portion of resources used by surrounding access devices for the OTA communication, from a new access device added to the uncoordinated access network;
    stopping transmission for the OTA communication during said discovery state and searching for an identity of said new access device using the physical identification signal;
    signaling said new access device about the detection of the physical identification signal; and
    transferring from the discovery state to the communication state to continue the transmission for the OTA communication.

8. A method according to claim 7, further comprising decoding by the communication device, said physical identification signal with said identity.

9. A method according to claim 7, further comprising acknowledging the detection of said physical identification signal via a wireless interface.

10. A method according to claim 7, further comprising switching the communication device back from said discovery state to the communication state in response to a timer operation.

11. A method according to claim 7, further comprising acknowledging with said new access device via a wireless interface after successful searching.

12. A computer program product comprising a non-transitory computer-readable medium bearing computer program code embodied therein for use with a computer, the computer program code when executed by the computer causing the computer to perform the method of claim 7.

13. An apparatus comprising:
at least one processor; and at least one non-transitory memory including computer program code, the at least one non-transitory memory and the computer program code configured, with the at least one processor, to cause the apparatus to perform at least the following:
temporarily switching to a discovery state when said apparatus is added to an uncoordinated access network; and
broadcasting physical identification signals in at least a portion of resources used by surrounding access devices for over-the-air (OTA) communication in response to said switching to said discovery state to said uncoordinated access network, and for waiting for a response to the detection of the physical identification signals, received from the surrounding access devices, wherein the response is a physical signal carried in the at least a portion of the OTA resources and does not indicate specific ones of the surrounding access devices.

14. An apparatus according to claim 13, wherein said apparatus is configured to broadcast said physical identification signals via a wireless interface.

15. An apparatus according to claim 13, wherein said apparatus is configured to transmit a message and to receive a response via a wireless interface.

16. An apparatus according to claim 13, wherein said apparatus is configured to initiate said temporary setting into said discovery state after a cell search procedure has been finished and an over-the-air communication configuration is known to said new access device.

17. An apparatus according to claim 13, wherein said apparatus is configured to switch back from said discovery state to a communication state in response to an output of the timer.

18. An apparatus according to claim 13, wherein said apparatus is configured to switch back from said discovery state to a communication state after the receipt of at least one acknowledgement from a surrounding access device.

19. An apparatus comprising:
at least one processor; and at least one non-transitory memory including computer program code, the at least one non-transitory memory and the computer program code configured, with the at least one processor, to cause the apparatus to perform at least the following:
entering into discovery state in response to a detection of an acknowledgement that is a physical identification signal received in at least a portion of resources used by surrounding access devices for over-the-air (OTA) communication and does not indicate specific ones of surrounding access devices, from a new access device; and
stopping transmission during said discovery state and initiating a search procedure for an identity of said new access device using the physical identification signal, wherein said apparatus is configured to switch back from said discovery state to a communication state in response to an output of a timer.

20. An apparatus comprising:
at least one processor; and at least one non-transitory memory including computer program code, the at least one non-transitory memory and the computer program code configured, with the at least one processor, to cause the apparatus to perform at least the following:
entering into a discovery state in response to a detection of an acknowledgement that is a physical identification signal received in at least a portion of resources used by surrounding access devices for over-the-air (OTA) communication and does not indicate specific ones of surrounding access devices, from a new access device; and
stopping transmission during said discovery state and initiating a search procedure for an identity of said new access device using the physical identification signal, wherein said apparatus is configured to switch back from said discovery state to a communication state after a successful search procedure and to send out an acknowledgement.

21. an apparatus comprising:
at least one processor; and at least one non-transitory memory including computer program code, the at least one non-transitory memory and the computer program code configured, with the at least one processor, to cause the apparatus to perform at least the following:
entering into a discovery state in response to a detection of an acknowledgement that is a physical identification signal received in at least a portion of resources used by surrounding access devices for over-the-air (OTA) communication and does not indicate specific ones of surrounding access devices, from a new access device; and
stopping transmission during said discovery state and initiating a search procedure for an identity of said new access device using the physical identification signal, further comprising performing said search procedure with a detector capable of deriving said identity from a coding of said physical identification signal.

* * * * *

UNITED STATES PATENT AND TRADEMARK OFFICE
CERTIFICATE OF CORRECTION

| | |
|---|---|
| PATENT NO. | : 9,031,556 B2 |
| APPLICATION NO. | : 13/145405 |
| DATED | : May 12, 2015 |
| INVENTOR(S) | : Skov et al. |

It is certified that error appears in the above-identified patent and that said Letters Patent is hereby corrected as shown below:

In the Claims

Claim 6, col. 8, line 36 "compute" should be deleted and --computer-- should be inserted.

Claim 17, col. 9, line 44 "the" should be deleted and --a-- should be inserted.

Claim 18, col. 9, line 47 "the" should be deleted in between "after" and "receipt".

Claim 19, col. 10, line 3 insert --a-- in between "into" and "discovery".

Signed and Sealed this
Twenty-first Day of July, 2015

Michelle K. Lee
*Director of the United States Patent and Trademark Office*